United States Patent [19]

Wolfram et al.

[11] Patent Number: 4,575,145

[45] Date of Patent: Mar. 11, 1986

[54] DIFFERENTIAL AXLE FOR RAILROAD CAR

[76] Inventors: Norman E. Wolfram, 216 Millers Falls Rd., Turners Falls, Mass. 01376; Frederick T. Skalski, Upper Road, West Deerfield, Mass. 01342; William E. Heronemus, 730 West St., Amherst, Mass. 01002

[21] Appl. No.: 681,285

[22] Filed: Dec. 13, 1984

[51] Int. Cl.[4] .................... B60B 37/10; F16C 17/10; F16C 33/20
[52] U.S. Cl. ........................................ 295/37; 295/44; 384/275; 384/300
[58] Field of Search .................. 295/35, 37, 44, 47, 295/49; 384/275, 296, 299, 300

[56] References Cited

U.S. PATENT DOCUMENTS

| 267,508 | 11/1882 | Fairman | 295/35 X |
| 1,108,867 | 8/1914 | Muggley | 295/35 |
| 1,316,087 | 9/1919 | Dowe | 295/37 |
| 2,906,567 | 9/1959 | Runton et al. | 384/300 X |
| 3,321,232 | 5/1967 | Johnson | 295/37 |
| 3,802,352 | 4/1974 | Keller | 295/37 X |
| 4,239,007 | 12/1980 | Kleykamp et al. | 384/299 X |

FOREIGN PATENT DOCUMENTS 564652  6/1925  France ......................... 295/44

Primary Examiner—Robert B. Reeves
Assistant Examiner—David F. Hubbuch
Attorney, Agent, or Firm—Chapin, Neal & Dempsey

[57] ABSTRACT

Differential mounting for railroad wheels includes an axle with a wheel fitted on one end to rotate with the axle and a second wheel carried adjacent the opposite end of the axle and mounted to rotate relative to the axle. The axle has a raised wheel seat with an axial length approximately the same as the hub of the second wheel which is generally rectangular in cross-section. Fillets define the inboard and outboard ends of the raised wheel seat and a steel sleeve is fitted over the raised wheel seat and includes an annular flange portion shaped to engage the outboard axle fillet. A collar carried within the sleeve engages the inboard fillet. Pressure plates are disposed on the inboard and outboard ends of the sleeve and include opposed stainless steel thrust bearing surfaces contiguous to the annular side faces of the wheel hub which are surfaced with a TEFLON composite, bearing material bonded thereto. The sleeve has a stainless steel outer bearing surface portion for rotating contact with the bore of the wheel hub which is fitted with a TEFLON liner.

6 Claims, 5 Drawing Figures

DIFFERENTIAL AXLE FOR RAILROAD CAR

BACKGROUND OF THE INVENTION

This invention relates to railroad car wheel mountings and more particularly to improve differential wheel and axle constructions.

Rail car differential wheel and axle constructions of various types have been disclosed in the prior art and patents which relate to such construction include: U.S. Pat. No. 201,726, dated 1878 to Watkeys; U.S. Pat. No. 237,906, dated 1881, to Rhett; U.S. Pat. No. 1,292,663 to Thomas and U.S. Pat. No. 1,316,087 to Dowe. These patents disclose various differential wheel constructions for railroad cars in which one of a pair of rail car wheels is press-fitted onto an axial elongated sleeve rotatably mounted on a rail car axle. In this manner, the sleeve mounted wheel is free to rotate about the axle independently of another wheel which is press-fitted directly adjacent the other end of the axle. Among the drawbacks of these constructions are the difficulty of bearing lubrication, the fretting of the metal-to-metal bearing surfaces and the need for specialized and costly axle constructions.

The assembly disclosed in Johnson U.S. Pat. No. 3,321,232, issued in May 1967, involves a completely separate short axle mounted onto the end of a longer axle. A full length hollow cylindrical axle is supported on both ends by roller bearings and the short axle is attached to one end of the hollow axle. This arrangement is complicated and very costly.

It is the principal object of this invention to provide differential railroad wheel and axle constructions which overcome the drawbacks of the prior art.

It is another object of this invention to provide a method for adapting conventional railroad axles for use in differential wheel and axle combination which meet the standards of the Association of American Railroads (AAR).

It is a further object of this invention to provide a differential wheel and axle construction which relieves the stresses in the wheel-to-axle interface and eliminates steel-to-steel surface rubbing contact subject to fretting.

It is still a further object of this invention to provide differential wheel and axle constructions which overcome the problems of fretting corrosion, brinelling failure and which are capable of resisting lateral forces caused by rail-on-wheel thrust.

The above and other objects and advantages of this invention will be more readily apparent from the following description, read in conjunction with accompanying drawings, in which.

Figure 1:
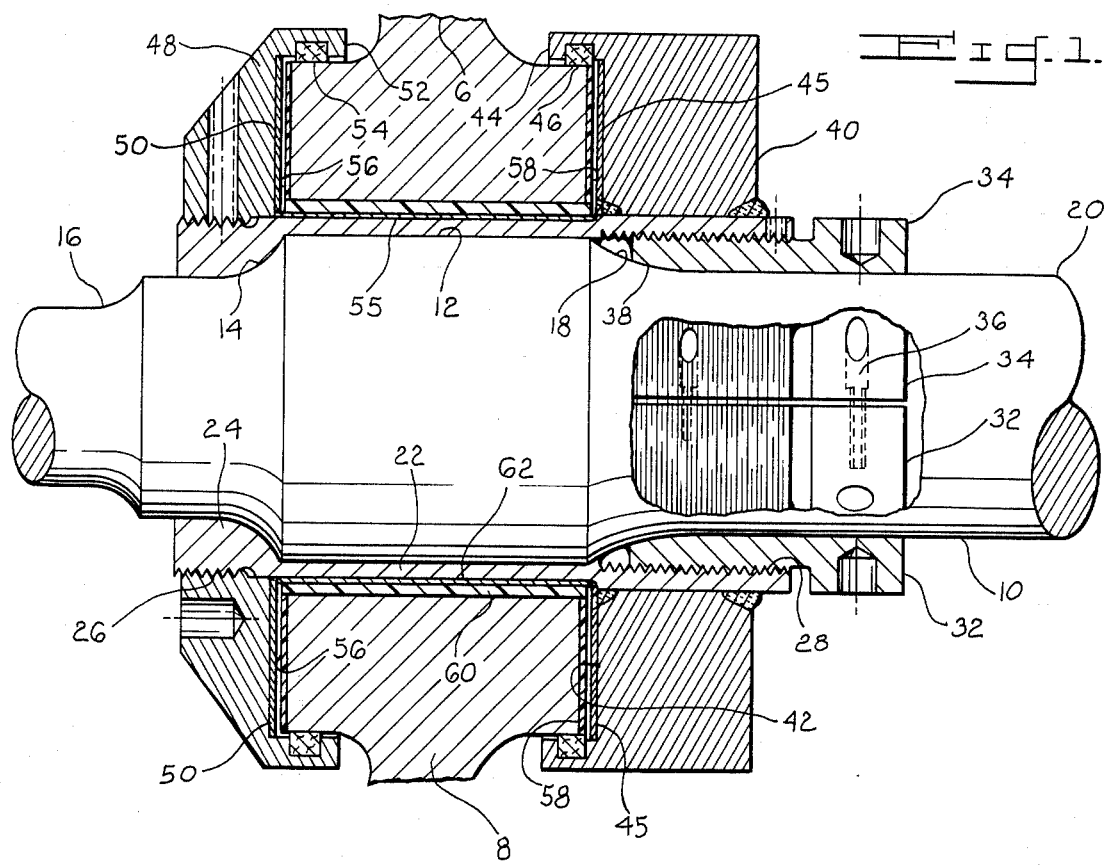
FIG. 1 is a cross-sectional elevational view of a railroad car differential wheel and axle bearing construction of the type embodying this invention.

Referring in detail to the drawing, in FIG. 1 is shown a railroad wheel 6 which has annular hub portion 8 supported for rotation about an axle 10. The axle includes a raised wheel seat portion 12 of substantially greater diameter than that of the remainder of the axle. The axle includes a curved shoulder or fillet 14 adjacent its outboard end 16 and similar fillet 18 facing toward the inboard portion 20 of the axle.

A metallic sleeve or spool 22 is fitted over the enlarged wheel seat portion of the axle and includes, at its outboard end, an annular rim or bead 24 of convex curvature adapted to mate with the concave fillet 14 in surface-to-surface contact. The outer end portion of the spool is externally threaded, as indicated at 26 and the spool has a length substantially greater than the axial length of the wheel seat portion 12 of the axle and the inboard end of the spool is internally threaded, as shown at 28.

A split collar 30 (FIG. 3) having two semi-circular halves 32 and 34 is fitted around the inboard portion of the axle 10. The two halves may be fastened together by bolts or other fasteners extending through threaded holes 36 which circumferentially span the mating surfaces of the two halves to provide the split cylindrical collar 30. At its inner end, the collar 3 is externally threaded to screw-fit with the internally threaded spool 22.

At its outer end, disposed adjacent the wheel seat 12, the inner suface of the collar 30 is formed with an annular radius portion 38 which engages the fillet 18 of the shaft.

Disposed on the outer surface of the sleeve 22 is a plate or flange which is welded onto the sleeve, as shown in FIG. 1, and serves as an inboard retainer or pressure plate 40 for the hub of the wheel 6. The plate 40 includes an inner, annular bearing surface 42 onto which stainless steel surface 45 is deposited preferably by a plasma arc process. The inboard pressure plate includes an inwardly extending axial rim portion 44 in which is fitted a ring seal 46, which may be an oil saturated felt seal ring.

Figure 2:
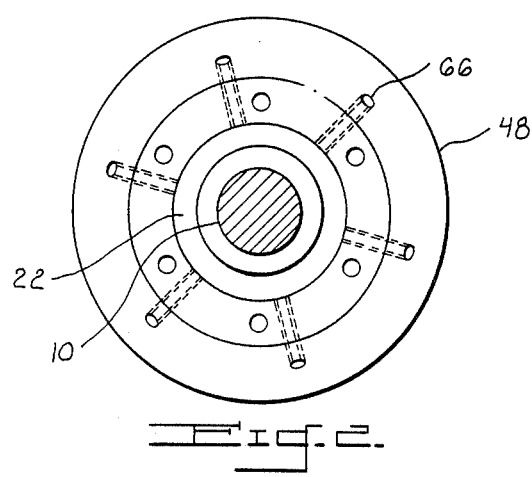
FIG. 2 is an outboard end elevational view on a reduced scale, of the FIG. 1 embodiment.

An outboard pressure plate 48 is screw-fitted onto the outboard end portion of the spool or sleeve 22. This plate is internally threaded and also has an annular stainless steel inner bearing surface 50. The plate 48 also includes an axially extending rim portion 52 with a seal ring 54 carried therein. The outboard pressure plate 48, as shown in FIG. 2, includes a plurality of radially extending, uniformly, circumferentialy spaced threaded bores 66 adapted to receive soft-nosed set screws (not shown) to secure the plate 48 in fixed position on the sleeve 22 to produce the desired resisting torque.

The hub portion 8 of the wheel 6 which is generally rectangular in cross-section includes annular surfaces coated with wear resistant thrust washers having a low coefficient of friction, such as polytetrafluoroethylene marketed under the Trademark "TELFON", as indicated at 56 and 58. A cylindrical liner or sleeve of TEFLON 60 is also bonded to the axial bore of the wheel 6 and this low friction material is in contact with a stainless steel surface 62 deposited by plasma arc process onto the outer surface of the portion of sleeve 22 corresponding in length to the TEFLON sleeve 60. The TEFLON liners may be fiber reinforced with a glass fiber matrix or the like. With this construction, the wheel bearing is completely sealed by the inner and outer pressure plates and by ring seals 46 and 54. There is, moreover, an absence of metal-to-metal contact in the wheel bearing since both the axial and radial surfaces of the wheel hub are TEFLON coated, while the mating surfaces of the sleeve 22 and the pressure plates are stainless steel coated by the plasma arc process.

A number of alternate rubbing surfaces are considered acceptable, such as a plasma arc deposited aluminum alloy of the harder alloys, polished to a mirror finish could be employed in place of the stainless steel. Oven-sintered TEFLON derivatives, such as "RITON", may be applied directly onto the outer surface of the sleeve 22 and the annular bearing surfaces 45 and 50 of the pressure plates in place of the stainless steel surfacing.

Alternatively, the bore and annular side faces of the wheel hub could be left as machined, ground and polished carbon steel bearing on oven-sintered TEFLON applied to the outer surface of the sleeve 22 and the annular faces of the inboard and outboard pressure plates.

By referring to FIG. 1, it will be recognized that the load path for reaction to any lateral or transverse load applied by a rail to the wheel 6 would be applied by the wheel hub to the inboard or outboard pressure plates 40 or 48, depending upon the direction of the thrust. In either case, the forces would be transmitted by the TEFLON coating 56 or 58 on the wheel hub to the stainless steel surfaces 45 or 50 of the respective pressure plates. Any rubbing that occurs between these two surfaces is at a very low coefficient of friction and this combination of materials completely eliminates fretting and stick-slip between these bearing surfaces. The spool 22 in turn transmits that load into the axle itself primarily by the annular surfaces 24 and 38 bearing against the fillets 14 and 38. Some of the load is transmitted to the raised wheel seat 12 by the light press-fit of the sleeve 22 thereon.

Figure 3:
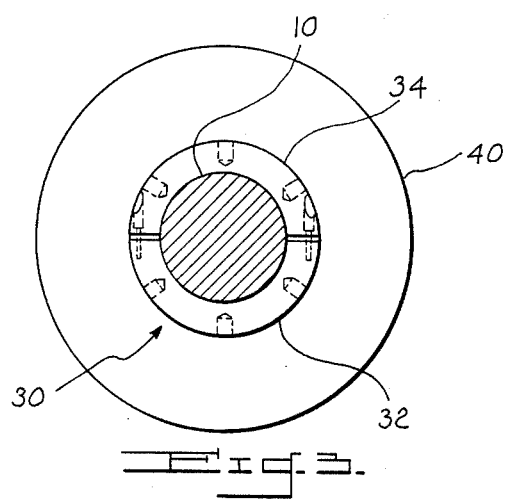
FIG. 3 is a view similar to FIG. 2 showing the opposite end of the bearing construction.
Figure 4:
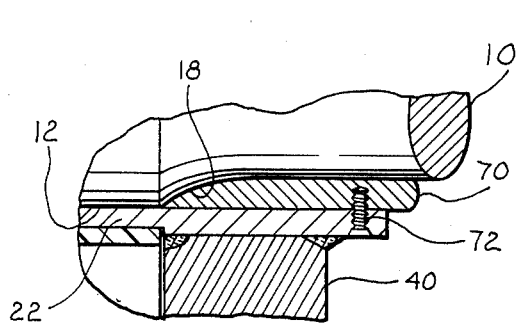
FIG. 4 is a partial cross-sectional view similar to FIG. 1 showing an alternative bearing construction.

In FIG. 4, an alternative embodiment of this invention is shown in which the split sleeve 30 of FIGS. 1 and 3 is replaced by a collar 70 of annular configuration. The tubular collar 70 is fitted onto the inboard end of the axle 10 and is swaged so that its inner surface will closely conform with the inboard fillet 18 of the raised wheel seat 12. The collar 70 is of sufficient axial length, on the order of approximately six (6") inches, so that its external surface added to that of the raised wheel seat will permit the axle sleeve or spool 22 to be simply press-fitted thereon with sufficient axial stability to meet the standards of the Association of American Railroads (AAR). This alternate construction may be carried one step further by machining the outer surface of the collar 70 to bring it to the same diameter as the wheel seat 12. After press-fitting the sleeve 22 onto the axle and collar 70, radially extending, circumferentialy spaced fasteners, such as set screws 72, may be used to provide additional structure stability between the collar 70 and sleeve 22. It is important, however, that these fasteners not be allowed to extend into contact with axle 10.

Figure 5:
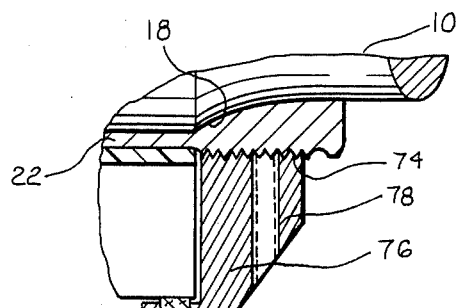
FIG. 5 is a view similar to FIG. 4 illustrating another alternative bearing construction.

In FIG. 5, another alternate embodiment is shown in which the axle spool or sleeve 22 is provided with an enlarged end portion. After fitting the sleeve 22 onto the axle 10, the end portion of the sleeve is swaged inwardly so that its inner surface will conform with the inboard fillet 18 of the axle 10. After swaging, the axle spool is machined to provide a raised surface which is than threaded, as shown at 74 in FIG. 5. An inboard pressure plate 76 may be screw-fitted onto the sleeve 22 and locked in place by set screws extending through a plurality of circumferentially spaced, threaded, radial bores 78. This embodiment is considered to be preferable for large scale assembly line retrofit of rail axles because it provides the easiest attainment of perfect thread gauge.

The FIG. 5 embodiment may also be modified somewhat by omitting the screw threads 74 on the sleeve 22 and then welding an inboard pressure plate to the inner end of the sleeve in a manner similar to the end plate 40 of FIG. 1.

In the method embodying this invention, a steel sleeve or spool is telescopically tilted onto the raised wheel seat of a railroad car axle. The sleeve has an axila length substantially greater in length than that of the raised wheel seat. Fillets define the inboard and outboard ends of the raised wheel seat and the sleeve includes an annular collar portion which engages the outboard fillet. The collar means carried by the sleeve engage the inboard fillet to retain the sleeve in fixed axial relation on the axle. The hub of a railroad wheel is then fitted onto that portion of the sleeve corresponding to the rasied wheel seat. The inner cylindrical bearing surface of the hub and the riding surface of the sleeve are oppositely surfaced with a non-metallic material having a low coefficient of friction and a hard, polished metallic surface. Inboard and outboard pressure plates fixedly mounted on the sleeve and then inner annular surfaces and the opposing outer annular surfaces of the wheel hub are oppositely surfaced with non-metallic material having a low coefficient of friction and a hard, polished metallic surface. The pressure plates are each provided with ring seals for completely sealing the wheel bearing surfaces.

Having thus disclosed this invention, what is claimed is:

1. Differential wheel mounting for railroad cars having a standard railroad axle with a raised wheel seat portion adjacent at least one end, a first wheel fixedly mounted adjacent the other end of such axle and a second wheel having a hub rotatably mounted relative to said axle on the raised wheel seat of the axle, the second wheel mounting comprising a steel cylindrical sleeve fitted about said raised wheel seat and having an axial length substantially greater than the length of the raised wheel seat to provide extensions inboard and outboard of the second wheel hub, means for retaining said sleeve in fixed axial relation on said raised wheel seat, wheel retaining flanges affixed to the inboard and outboard extensions of said sleeve to provide thrust bearing surfaces for the hub of the second wheel, the opposed annular surfaces of the wheel hub, the retaining flanges and the inner cylindrical bore of said hub and the outer bearing surface of said sleeve being oppositely surfaced with a relatively hard corrosion and wearing resistant metal and with a non-metallic, long wearing surface of a material having a low coefficient of friction.

2. Differential wheel mounting as set forth in claim 1, in which said relatively hard surface is stainless steel and the non-metallic material is polytetrafluoroethylene.

3. Differential wheel mounting as set forth in claim 1, in which the retaining means for said sleeve includes an outboard end portion having a configuration for engaging said axle adjacent its raised wheel seat.

4. Differential wheel mounting as set forth in claim 3, in which said retaining means further includes an externaly threaded split collar fitted on the inboard side of said raised wheel seat and threadedly engaged with the inborad end of said sleeve to retain the same in fixed axial relation on said axle.

5. Differential wheel mounting as set forth in claim 3, in which said retaining means further includes a collar fitted onto the inboard side of said raised wheel seat and swaged to engage an inboard end fillet of the wheel seat and is carried by the sleeve to hold the same in fixed axial relation on said axle.

6. Differential wheel mounting as set forth in claim 5, in which the swaged portion of the collar is an inner end portion of the sleeve.

* * * * *